United States Patent [19]

Widmann et al.

[11] Patent Number: 4,856,278

[45] Date of Patent: Aug. 15, 1989

[54] CONTROL ARRANGEMENT FOR AT LEAST TWO HYDRAULIC CONSUMERS FED BY AT LEAST ONE PUMP

[75] Inventors: Karlheinz Widmann; Norbert Kreth, both of Lohr; Martin Schmitt, Goldbach; Armin Stellwagen, Lohr, all of Fed. Rep. of Germany

[73] Assignee: Mannesmann Rexroth GmbH, Fed. Rep. of Germany

[21] Appl. No.: 138,934

[22] Filed: Dec. 29, 1987

Related U.S. Application Data

[63] Continuation-in-part of Ser. No. 944,432, Dec. 19, 1986, Pat. No. 4,759,183.

[30] Foreign Application Priority Data

Dec. 30, 1985 [DE] Fed. Rep. of Germany ....... 3546336

Dec. 30, 1986 [DE] Fed. Rep. of Germany ....... 3644736

[51] Int. Cl.[4] ............................................ F16D 31/02

[52] U.S. Cl. ........................................ 60/423; 60/426; 60/427; 60/452; 91/446; 91/459

[58] Field of Search ................. 60/422, 423, 426, 427, 60/452, 445, 484; 91/446, 448, 459

[56] References Cited

U.S. PATENT DOCUMENTS

| | | | |
|---|---|---|---|
| 4,327,549 | 5/1982 | Bianchetta et al. | 60/426 |
| 4,708,596 | 11/1987 | Palm et al. | 60/459 X |
| 4,712,375 | 12/1987 | Kauss et al. | 60/422 X |
| 4,712,376 | 12/1987 | Hadank et al. | 60/452 X |
| 4,738,103 | 4/1988 | Tha | 60/452 X |
| 4,739,617 | 4/1988 | Kreth et al. | 60/427 X |
| 4,756,156 | 7/1988 | Appel | 60/426 |
| 4,759,183 | 7/1988 | Kreth et al. | 60/445 X |

FOREIGN PATENT DOCUMENTS

| | | |
|---|---|---|
| 2651325 | 8/1977 | Fed. Rep. of Germany . |
| 2757660 | 6/1979 | Fed. Rep. of Germany . |
| 2911118 | 10/1979 | Fed. Rep. of Germany . |
| 3321483 | 12/1984 | Fed. Rep. of Germany . |
| 3546336 | 7/1987 | Fed. Rep. of Germany . |

*Primary Examiner*—Edward K. Look

*Attorney, Agent, or Firm*—Harness, Dickey & Pierce

[57] ABSTRACT

According to the parent patent on inadequate power of the delivery pump the flow rate set at the directional control valves for the consumers is reduced in equal proportions in that electrical signals proportional to the flow rates are supplied to a summation stage and the sum voltage is compared in a comparison stage with a limit value corresponding to the maximum pump delivery flow. When the limit value is exceeded a control signal is generated with which the stroke of all the driven directional control valves can be jointly reduced. According to the application of addition the signal voltage supplied to the summation stages and corresponding to the respective flow rate can be obtained in a displacement pickup associated with each directional control valve or in a pressure pickup measuring the pilot pressure if the directional control valves are not controlled electrically but hydraulically. Furthermore, the pilot pressure can also be generated by a valve arrangement which switches in pulsating manner and to the regulator of which the control signal is supplied when the limit value is exceeded.

22 Claims, 4 Drawing Sheets

CONTROL ARRANGEMENT FOR AT LEAST TWO HYDRAULIC CONSUMERS FED BY AT LEAST ONE PUMP

CROSS REFERENCE TO RELATED APPLICATION

This application is a continuation-in-part of our application Ser. No. 944,432, filed Dec. 19, 1986 issued July 26, 1988 as U.S. Pat. No. 4,759,183.

BACKGROUND OF THE INVENTION

The invention relates to a control arrangement for at least two hydraulic consumers or loads fed by at least one pump.

With the control arrangement according to the parent patent (DE-PS 3,546,336) the problem is solved in the event of a so-called power hole of the pump of reducing the flow rates set at the directional control valves in equal proportion electrically with great accuracy. For this purpose electrical signals are generated which correspond to the respective flow rates and which are first added in a summation stage and then compared in a comparison stage with a limit value corresponding to the pump delivery flow. If the summation voltage is higher than the limit value a control signal is generated with which the flow through the directional control valves is reduced in the same proportion.

In the embodiment provided in the parent patent the directional control valves are electrically actuated so that for the equal proportional reduction of the travel or stroke of all the directional control valves the control arrangement simply reduces the supply voltage which is supplied to the potentiometers of the control pickups or generators driving the directional control valves.

SUMMARY OF THE INVENTION

The present invention is directed to advantageous further developments and further embodiments according to the invention. These embodiments have in common that the flow rates flowing to the consumers are electrically detected, the sum of said signals is formed and the sum is compared with an electrical signal representing the pump delivery flow, the control arrangement being constructed in accordance with the parent patent. The electrical signals proportional to the flow rates can however be obtained in different manner. If the directional control valves are not electrically actuated but hydraulically with pilot pressures set at pickup or generator devices the flow rate can be determined in simple manner by a displacement pickup connected to the directional control valve and supplying a signal corresponding to the stroke and thus the flow rate.

However, instead of the displacement pickup a pressure pickup may also be provided for the pilot pressure, the output signal of which also furnishes to adequate approximation a signal corresponding to the stroke of travel of the directional control valve.

In both cases the control signal which is generated when the sum voltage is greater than the limit value is supplied to a pressure control means, preferably a pressure regulating valve, which reduces the pilot pressure accordingly so that by the control generators or pickups, i.e. the pilot valves, a correspondingly reduced pilot pressure is supplied jointly to all the directional control valves and the flow rates are reduced accordingly. It is necessary for this purpose for the control generators or pickups to be constructed as pressure dividers with two oppositely adjustable throttle valves. In this manner the desired reduction of the pilot pressure for the stroke reduction can be produced in constrained manner. As pilot valves the usual pressure reducing valves thus cannot be used because in them the control pressure supplied to the directional control valves remains constant even with greatly varying input pressure.

Instead of the pressure regulating valve for setting the pilot pressure the latter may also be preselected and set for each individual directional control valve with a digitally controlled fast-switching directional control valve. The pilot pressure line is connected in pulsating manner to a pump and the pilot pressure measured in a pressure pickup and supplied as actual value to the control device in which it is compared with a preselected desired value. Such an arrangement is known. This arrangement is particularly suitable for setting the pilot pressure with the control arrangement according to the invention. In particular it is advantageous that the pressure pickup necessary for the digital activation of the switching valves for generating the pilot pressures are simultaneously used to supply the input signals for the flow rate regulator whose output signal when the limit value is exceeded is fed to all the digital control devices to reduce the pilot pressures for the individual directional control valves and thus correspondingly diminish the flow rates.

BRIEF DESCRIPTION OF THE DRAWINGS

Examples of embodiment of the invention will be explained hereinafter in detail with the aid of the drawings, wherein.

DETAILED DESCRIPTION OF THE PREFERRED EMBODIMENTS OF THE INVENTION

Figure 1:
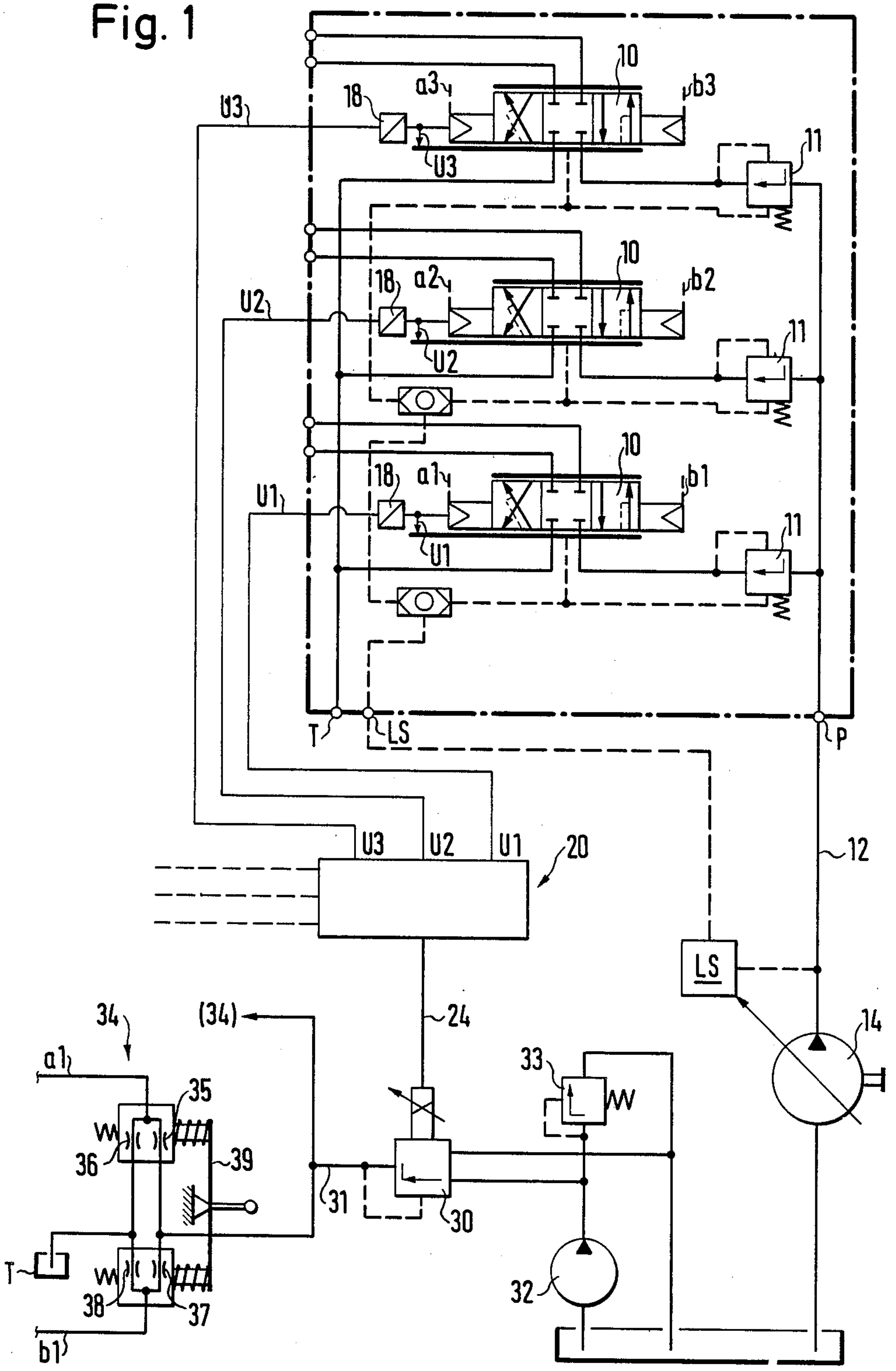
FIG. 1 is a hydraulic circuit diagram comprising a plurality of hydraulically precontrolled directional control valves with displacement pickups for connection to the stroke reducing circuit and a pressure regulating valve for generating the pilot pressure.

FIG. 1 shows a valve block for hydraulic consumers or loads of for example an excavator in which a plurality of directional control valves 10 are arranged which are actuable hydraulically via connections a1, a2, a3 and b1, b2, b3. These are the usual directional control valves with each of which a pressure balance 11 is associated and which are all connected via the connection P to a delivery conduit 12 of a variable displacement pump 14. In likewise known manner the particular highest load pressure arising at one of the consumers is connected via shuttle valves to a connection LS. The delivery rate is set in known manner by the difference of the pump pressure in the conduit 12 and the highest load pressure at the connection LS by means of a pump regulator.

Figure 2:
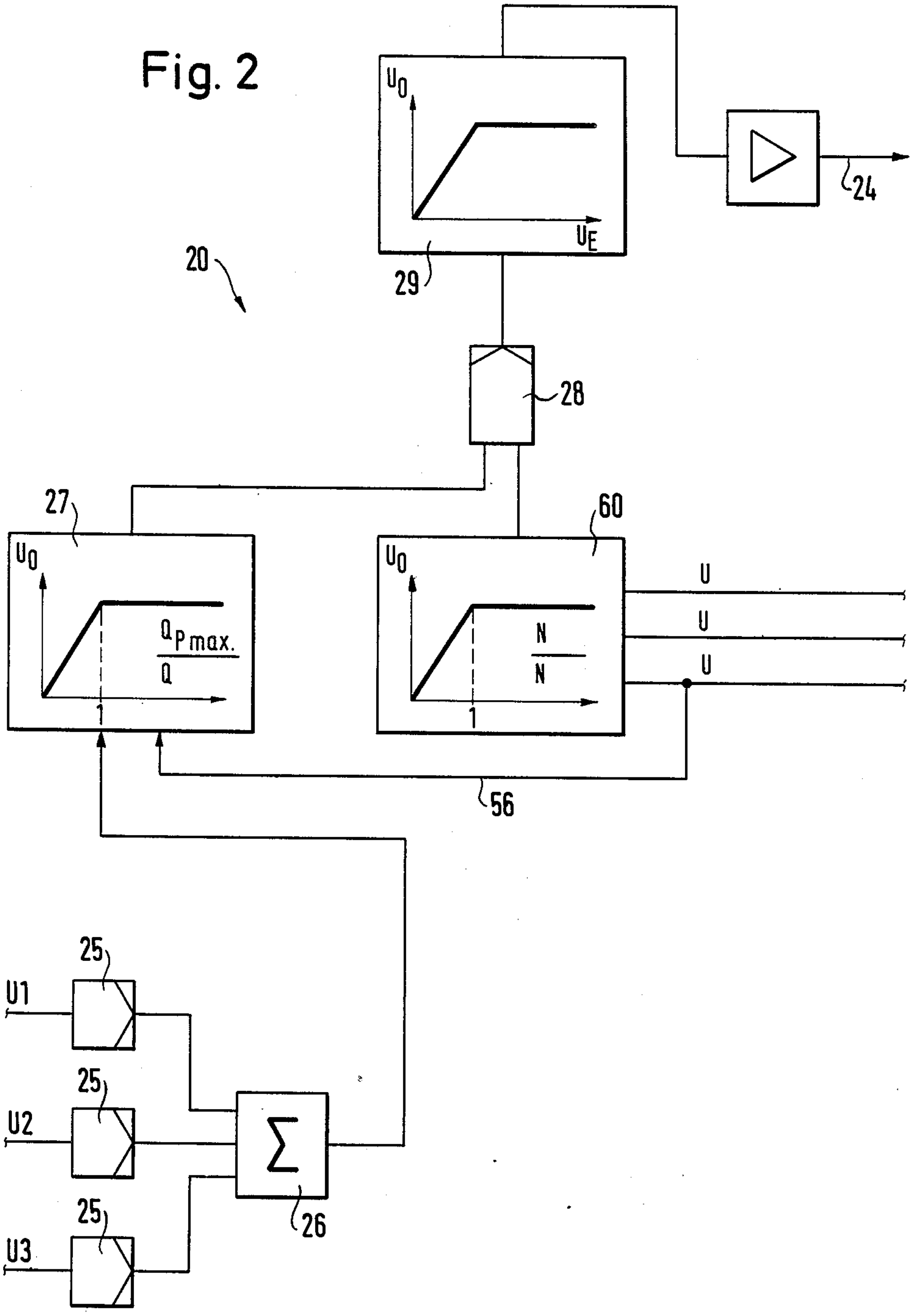
FIG. 2 is an electrical circuit diagram of the stroke or travel reducing circuit.

Provided at each directional control valve 10 is a displacement pickup 18 in which the stroke of the piston slide of each directional control valve is converted to a proportional electrical signal with the voltage U1, U2 and U3. These signals, which are thus proportional to the flow rates through the directional control valves 10, are sent to a control device 20 whose details are shown in FIG. 2. The control device 20 includes the circuit for stroke reduction of the directional control valves and a limit load regulator which is dependent on the oil temperature, the accelerator position and the speed of an internal-combustion engine, not shown, which drives the pump 14. The control device 20 consists of a matching computing means 25 per piston axis, a summation stage 26, a comparison stage 27, a matching amplifier 28, an adjustable voltage source 29 and a limit load regulator 60. These components are of identical construction to the components explained in FIG. 2 of the parent U.S. Pat. No. 759,183.

In the matching computing means 25 the voltage supplied by the particular displacement pickup of a directional control valve is converted to a voltage proportional to the respective valve identification and a voltage proportional to the particular flow rate set at the associated directional control valve thus formed. These voltages are summated in the summation stage and compared in the comparison stage 27 with a limit value which corresponds to a maximum available delivery rate of the pump 14. With a known maximum delivery volume said limit value can be derived from the speed of rotation of the pump and is supplied via a line 56 to the comparison stage 27.

If the sum voltage exceeds the limit value preset in the comparison stage 27 the voltage source 29 is driven via the matching amplifier 28 and the feed voltage of said voltage source on the output line 24 reduced proportionally.

Superimposed on the circuit for the stroke reduction of the directional control valves is a limit load regulator 60 to which voltages corresponding to the oil temperature, the gas pedal position and the speed of rotation of the drive engine are supplied. Depending upon these values the limit load regulator 60 also acts via the matching amplifier 28 on the voltage source 29 to reduce the supply voltage in the output line 24 accordingly. An overloading or excessive reduction or stalling of the drive engine is thus prevented.

As illustrated in FIG. 1, by the output voltage of the control device 20 via the line 24 a pressure regulating valve 30 is activated with which the pilot pressure in the line 31 is set. On the input side the pressure regulating valve 30 is connected to a pump 32 and protected with a valve 33.

As mentioned, the directional control valves 10 are controlled hydraulically in that depending on the adjustment direction via the connections a1 and b1 respectively pilot pressure is supplied which is set at a pilot pickup or generator 34 associated with each directional control valve. Each pilot generator or pickup is constructed as pressure divider with in each case two oppositely adjustable throttle valves 35, 36 and 37, 38 respectively. The throttle valves 35 and 36 lie in series between the control pressure line 31 and a tank T. The connection a1 of the directional control valve 10 is connected to the connection between the throttle valves 35 and 36. The connection b1 is connected in corresponding manner to the connection of the throttle valves 37 and 38 to set the pilot pressure at the connection b1. All the pilot generators or pickups are constructed in corresponding manner.

The actuation of the pilot generator is by a hand grip 39. On movement thereof for setting the pilot pressure at the connection a1 the upper nozzle 35 is opened and the lower nozzle 36 adjusted in the closure direction, the pressure in the connection a1 thus increasing. In the unactuated state the upper nozzle 35 is closed and the lower nozzle 36 open towards the tank. Thus, for adjusting the associated directional control valve 10 the desired pilot pressure is generated by pressure division.

Consequently, if the comparison stage 27 of the control device 20 responds when the sum voltage exceeds the limit value the electrical current supplied to the pressure regulating valve 30 via the line 24 is reduced and thus the control pressure in the conduit 31 diminished so that via the pilot generator or pickup 34 an adjustment of all the directional control valves takes place for equal proportional a1 reduction of the flow rates. If required accordingly by the system specific priority loads or consumers can be accepted from this flow reduction. For this purpose a second control fluid circuit is necessary with second pressure regulating valves and pilot generators. As pilot generator 34 generally known pressure reducing devices, for example according to U.S.-PS 3,766,944, may be used.

Figure 3:
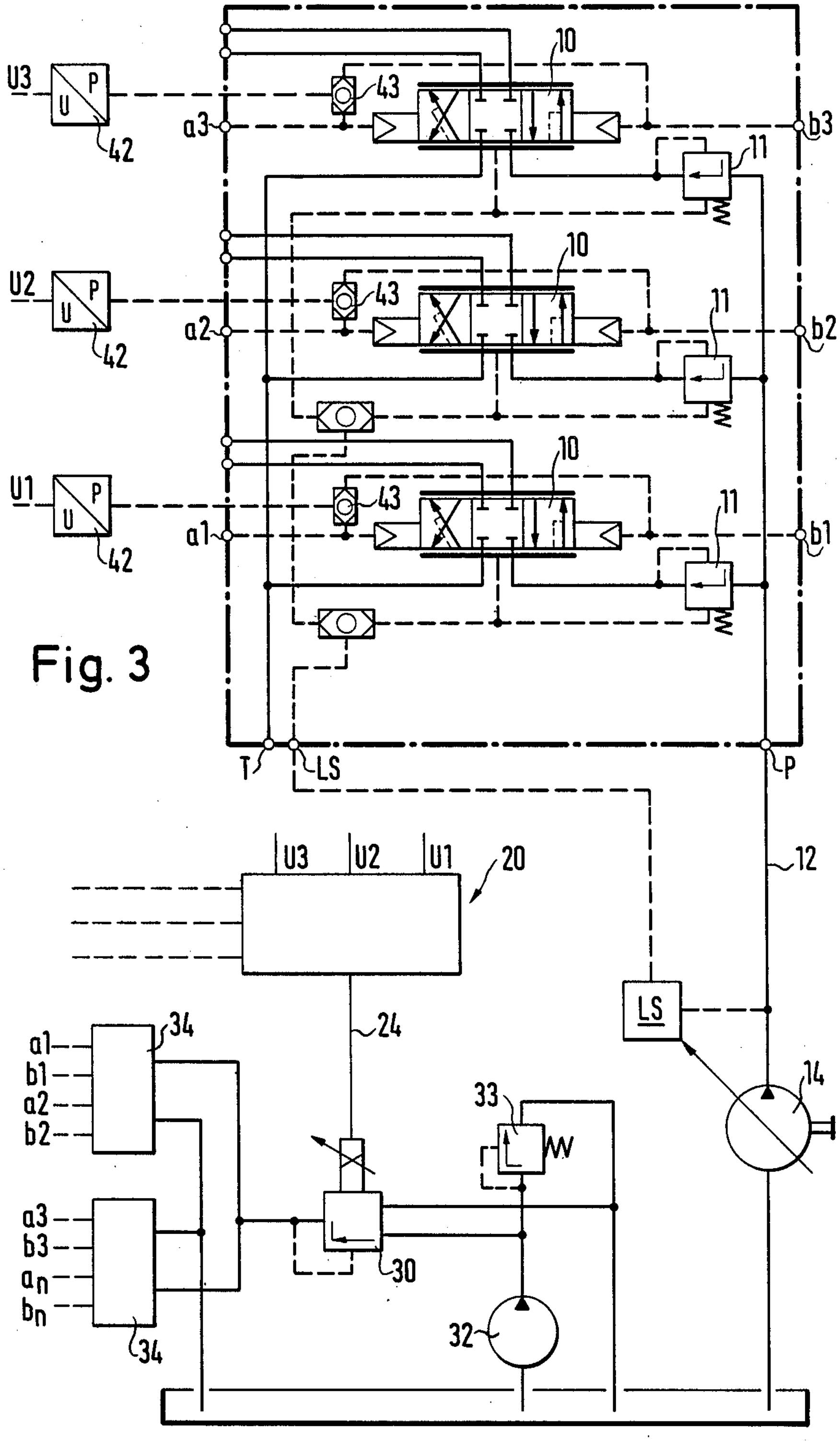
FIG. 3 is a hydraulic circuit diagram with a plurality of directional control valves with pressure pickups for connection to the stroke reducing circuit and a pressure regulating valve for setting the pilot pressure and FIG. 4 is a hydraulic circuit diagram with a plurality of directional control valves and pressure pickups for connection to the stroke reducing circuit and switching valves for generating the pilot pressure.

FIG. 3 shows a circuit diagram which corresponds in all details to the arrangement according to FIG. 1 with however the exception that instead of the displacement pickup at the directional control valves 10 pressure pickups 42 are provided to each of which the set pilot pressure at the connection a and b respectively is supplied via a shuttle valve 43. The pilot pressure set is a measure of the flow rate to the consumer set at the directional control valve. The output voltages U1 to U3 of the pressure pickups 42 are again fed to the control device 20 illustrated in FIG. 2.

Figure 4:
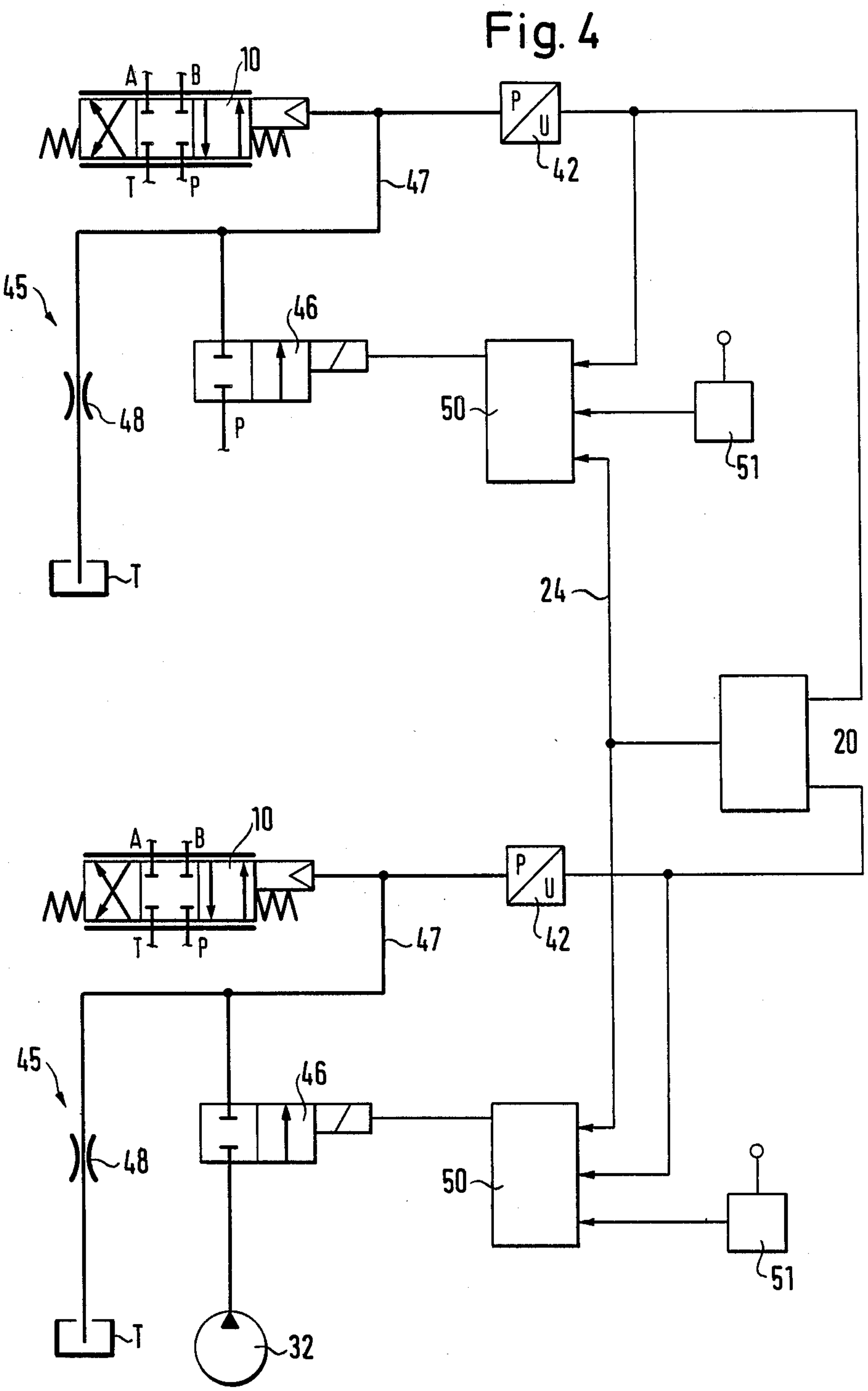

In FIG. 4 the pilot pressure for each individual hydraulically actuated directional control valve of a fast-switching digitally driven valve arrangement 45 is shown. Each valve arrangement 45 consists of a 2/2 directional control valve 46 which is provided in the control pressure line 47 leading from a pump 32 to the directional control valve 10 and a throttle 48 leading from the line 47 to a tank. The fast-switching valve 46 is digitally activated. For this purpose a controller 50 is used to which by the pressure pickup associated with the directional control valve a voltage proportional to the control pressure is supplied as actual value and also a desired value voltage set at a control pickup 51 is supplied. The control deviation formed in the controller 50 controls the valve 46 in pulsating manner so that a predetermined control pressure corresponding to the desired value is generated in the line 47 and is supplied to the directional control valve for hydraulic adjustment. By varying the switch-on duration of each valve ("duty ratio") the flow rate is controlled and thus the pressure at the orifice 48 built up.

The signals generated by the pressure pickups 42 for each directional control valve are supplied also to the control device 20, the construction of which is explained with reference to FIG. 2. The control signal furnished by the control device 20 when the limit value is exceeded is supplied via the line 24 to the controllers 50 of the valve arrangements 45 whose flow rate is to be reduced so that all the corresponding valve arrangements 45 are activated for corresponding reduction of the control pressure.

In an embodiment which is not illustrated the discharge throttle 48 can also be replaced by a 2-way switching valve identical to the valve 46 so that then both switching valves are activated by the controller. In another embodiment the two valves can be replaced by a joint 3/2 directional control valve.

In all cases the stroke of all the driven directional control valves 10 is reduced to such an extent that none of the consumers comes to a standstill but on the contrary the path curve set of the fluid or the tool is retained and the adjustment speed correspondingly reduced when the maximum delivery furnished by the pump no longer suffices. This measure prevents collapse of the pressure gradient at the directional control valves and avoids mutual influencing of the consumers and loss of fine controllability.

What is claimed:

1. Control arrangement for at least two hydraulic consumers, at least one pump, circuit means connecting the output of said pump with each of said consumers via a respective directional control valve for controlling the direction and velocity of the respective consumer, each directional control valve being actuated by means of a control pickup associated with the respective consumer, and a pressure balance in said circuit means between the respective directional control valves and said pump for providing a load-independent flow to the respective directional control valve derived from a pressure difference between the input and the output of the associated directional control valve, and means for reducing the total flow through the driven directional control valves when the pump delivery is not adequate by generating a control signal to reduce the stroke of the driven directional control valves, said means including a summation stage in which the signals corresponding to the respective flow rates through the directional control valves are summed and a comparison stage in which the sum voltage is compared with a limit value corresponding to the maximum pump delivery, said control signal being generated when the limit value is exceeded, characterized in that the directional control valves are hydraulically actuated and electrical signals corresponding to the respective flow rates through the directional control valves are derived in each from the position of the directional control valves.

2. Control arrangement according to claim 1, characterized in that position of each directional control valve is determined by an electrical displacement pickup and the outputs of the displacement pickups are connected to the summation stage.

3. Control arrangement according to claim 1 wherein the directional control valves are operated by pilot valves characterized in that the control signal of the control device is derived from a pressure control means to which the pilot valves are connected.

4. Control arrangement according to claim 3, characterized in that the pilot control of each directional control valve is provided with an electrical pressure pickup and the pressure pickups are connected to the summation stage.

5. Control arrangement according to claim 4, characterized in that the pressure pickups are each connected via a shuttle valve to the pilot connections on each side of the associated directional control valve.

6. Control arrangement according to claim 3, characterized in that the pilot valves are constructed as a pressure divider comprising two pairs of jointly and oppositely adjustable throttle valves, the control pressure line being connected via two throttle valves in series to a tank and the pilot pressure line leading to the associated directional valve being connected to the connection between every two throttle valves.

7. Control arrangement according to claim 4, characterized in the control signal of the control device drives a fast-switching valve arrangement for operating the respective directional control valve is connected to an associated valve arrangement.

8. Control arrangement according to claim 7, characterized in that the control signal for the reduction of the control pressure and the signal of a pressure pickup are supplied as actual value to a controller associated with the respective fast switch valve arrangement.

9. Control arrangement according to claim 7, characterized in that for each directional control valve a fast acting valve arrangement is provided.

10. Control arrangement according to claim 9, characterized in that the fast acting valve arrangement is a 2/2 directional control valve.

11. Control arrangement according to claim 10, characterized in that a throttle is provided in a line leading from the control pressure line to that tank.

12. Control arrangement according to clam 10, characterized in that in a further 2/2 directional control valve is provided the line leading from the control pressure line to the tank and both switching valves are activatable by the control.

13. Control arrangement according to claim 9, characterized in that the fast acting valve arrangement consists of a 3/2 directional control valve.

14. Control arrangement according to claim 7, characterized in that an electrical signal is supplied to the controller as desired value for the control pressure.

15. Control arrangement according to claim 1 with potentiometers as control pickups for setting the directional control valves, characterized in that by the control signal of the control device a variable voltage source is supplied to the potentiometers of the control pickups.

16. Control arrangement according to claim 1, characterized in that matching computing means are provided for transforming the signal voltage supplied to the summation stage is to an output voltage corresponding to the flow set through the directional control valve.

17. Control arrangement according to claim 16, characterized in that the matching computing means precedes the summation stage.

18. Control arrangement according to claim 1, characterized in that a limit load controller is superimposed on the comparison stage and generates a control signal in dependence upon parameters of a engine driving the pump, said control signal being employed to reduce the stroke of the drive directional control valves.

19. Control arrangement according to claim 18, characterized in that the control signal is generated in dependence upon the engine speed of rotation.

20. Control arrangement according to claim 18 wherein the engine is an internal-combustion engine, characterized in that the control signal is generated in dependence upon the output of the internal combustion engine.

21. Control arrangement according to claim 20, characterized in that the control signal is generated in dependence upon the oil temperature is the hydraulic system.

22. Control arrangement according to claim 3, characterized in that at least one of the directional control valves is driven by a pilot device supplied with a constant supply pressured from a control fluid circuit.

* * * * *